United States Patent
Ogatsu

(10) Patent No.: US 7,669,829 B2
(45) Date of Patent: Mar. 2, 2010

(54) CRADLE DEVICE FOR PORTABLE TERMINAL

(75) Inventor: Toshinobu Ogatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 452 days.

(21) Appl. No.: 10/591,755

(22) PCT Filed: Mar. 4, 2005

(86) PCT No.: PCT/JP2005/004267

§ 371 (c)(1),
(2), (4) Date: Mar. 9, 2007

(87) PCT Pub. No.: WO2005/086466

PCT Pub. Date: Sep. 15, 2005

(65) Prior Publication Data

US 2007/0187563 A1 Aug. 16, 2007

(30) Foreign Application Priority Data

Mar. 5, 2004 (JP) .............................. 2004-062158

(51) Int. Cl.
*F16M 11/00* (2006.01)
(52) U.S. Cl. .................. 248/682; 248/309.1; 455/569.2
(58) Field of Classification Search .................. 248/682, 248/688, 691, 309.1, 314, 300, 176.1, 671, 248/346.5, 455, 463; 345/173, 179, 901, 345/146; 361/686; 455/569.2; 379/419–446; 235/486
See application file for complete search history.

(56) References Cited

U.S. PATENT DOCUMENTS

| 4,969,830 | A |   | 11/1990 | Daly et al. |
| 5,100,098 | A |   | 3/1992 | Hawkins |
| 5,478,037 | A | * | 12/1995 | Haltof .................... 248/221.11 |
| 5,548,824 | A | * | 8/1996 | Inubushi et al. .......... 455/575.1 |
| 5,832,082 | A | * | 11/1998 | Nagai .......................... 379/449 |
| 5,995,622 | A | * | 11/1999 | Roussy et al. ................ 379/446 |
| 5,996,956 | A | * | 12/1999 | Shawver .................. 248/309.1 |

FOREIGN PATENT DOCUMENTS

| EP | 0 530 829 A2 | 3/1993 |
| JP | 8-18638 A | 1/1996 |
| JP | 2711784 B2 | 10/1997 |
| JP | 2001-101140 A | 4/2001 |
| JP | 2002-78213 A | 3/2002 |
| JP | 2002-117817 A | 4/2002 |
| JP | 2003-110677 A | 4/2003 |
| JP | 2003-319566 A | 11/2003 |
| WO | 98/25388 A1 | 6/1998 |

* cited by examiner

Primary Examiner—Ramon O Ramirez
(74) Attorney, Agent, or Firm—Sughrue Mion, PLLC

(57) ABSTRACT

The present invention provides a cradle device designed to be connected to a portable terminal which is provided with a connector at an upper part thereof for external electrical connection and with grooves formed at four corners of the outline to be held by means of the grooves. The cradle device has a structure to allow the portable terminal to slide so that the grooves formed in the connector portion and the portable terminal body can be securely engaged. The cradle device also has a rotate and slide mechanism in the face thereof opposing the connector, and has a structure to ensure reliable engagement with the grooves formed in the portable terminal body. Thus, the portable terminal cradle device is easy to carry, small-sized and superior in mechanical reliability, equally to the base unit, or the portable terminal.

10 Claims, 17 Drawing Sheets

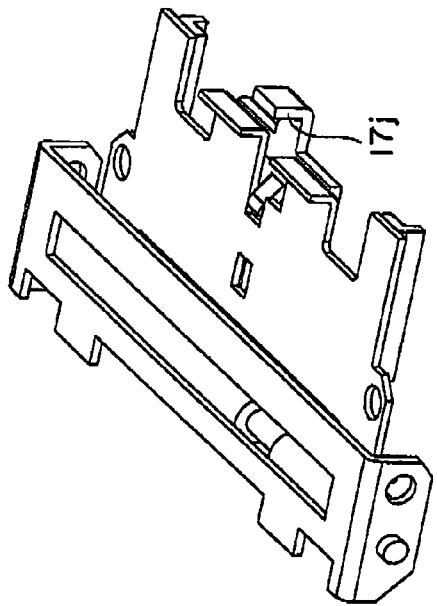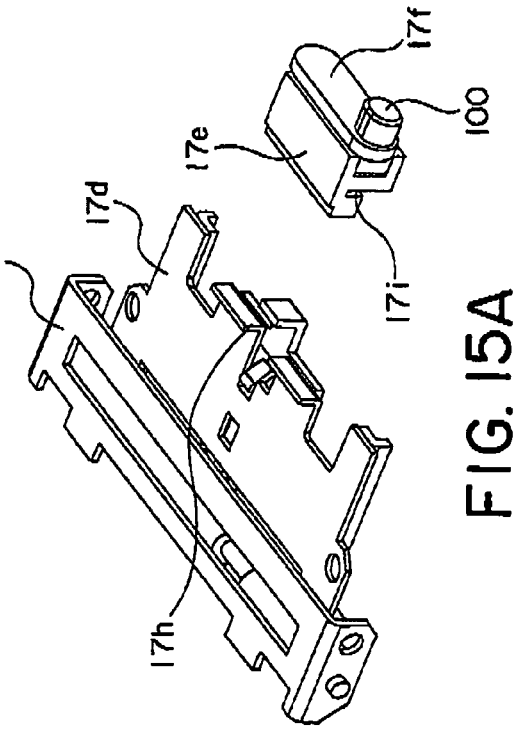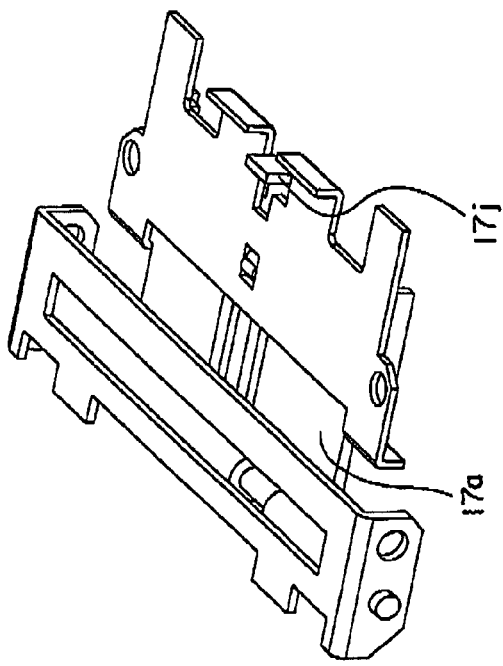

CRADLE DEVICE FOR PORTABLE TERMINAL

This application claims priority from PCT Application No. PCT/JP2005/004267 filed Mar. 4, 2005, and from Japanese Patent Application No. 2004-062158 filed Mar. 4, 2004, which applications are incorporated herein by reference.

TECHNICAL FIELD

The present invention relates to a cradle device mounted on a portable terminal such as a cellular phone, and particularly relates to a cradle device with superior portability.

BACKGROUND ART

Recently, portable terminals such as cellular phones and portable information devices have been rapidly developed to offer multiple functions. Along with this trend, there has emerged a demand to connect these portable terminals with other equipment. There has also emerged a problem of increased power consumption due to prolonged hours of usage. In order to solve such demand and problem, it is desired to increase the capacity of batteries for the portable terminals. On the other hand, by the nature of the portable terminals, there is still a strong demand to reduce the weight and size to improve the portability thereof.

In order to meet these contradictory demands, it is for example proposed to assign functions of some parts pertaining to a base unit (for example, functions of a connector for data communication) to a cradle device, which is originally used as a stationary holder for charging the base unit.

As the number of functions that the cradle device takes charge of is increased, it becomes necessary for a user to carry the cradle device as well. For example, Japanese Laid-Open Patent Publication No. 2001-101140 (Patent Document 1) and No. 2003-110677 (Patent Document 2) disclose a cradle which is formed foldable to give it portability. On the other hand, Japanese Patent No. 2711784 (Patent Document 3) focuses on improving the portability of a battery pack charger.

However, these cradle devices have several problems.

The first problem resides in the fact that these prior art examples put focus on the portability of the cradle by itself, and no consideration is given to the portability when the cradle device is connected to a portable terminal. When the cradle device has additional functions that the portable terminal does not have, it is necessary to improve the portability of the cradle device connected to the portable terminal.

The second problem resides in the fact these conventional cradle devices have low mechanical reliability. Although consideration is given to connectability to the base unit, no consideration is given to high mechanical reliability that the cradle device should have when carried in the condition connected to the portable terminal represented by a cellular phone.

DISCLOSURE OF THE INVENTION

It is therefore an object of the present invention to provide a portable terminal cradle device which is easy to carry, small-sized and superior in mechanical reliability, equally to a base unit, or a portable terminal.

A portable terminal cradle device according to the present invention and a combination of a portable terminal and a portable terminal cradle device according to the present invention are as follows.

1. A portable terminal cradle device including projections (11 and 18) formed at four corners thereof to be fitted on grooves (6 and 7) formed at four corners of the portable terminal.

2. The portable terminal cradle device according to the paragraph 1 above, characterized in that two of the projections (11) of the portable terminal cradle device are engaged in two of the grooves (6) in the upper end of the portable terminal, while, at the same time, the cradle device is electrically connected to the portable terminal through a connector joint (8) provided for connection to a connector (3) of the portable terminal; and that the other two projections (18) of the portable terminal cradle device are engaged in the two grooves (7) in the lower end of the portable terminal and the engagement is held by a rotate and slide mechanism (17) which is capable of both rotation and sliding.

3. The portable terminal cradle device according to the paragraph 2 above, further including a mechanism for locking the rotate and slide mechanism, and characterized in that lock blocks (17 and 17f) are slid along an L-shaped folded portion (17h) formed in a slide plate (17d) of the rotate and slide mechanism to fix and release an L-shaped folded portion (17j) formed in a hinge (17a).

4. The portable terminal cradle device according to the paragraph 1 above, characterized in that the portable terminal cradle device does not project forward beyond a monitor (1) or an operating face (2) of the portable terminal, whereby the operation of the portable terminal when mounted to the cradle device is made easy and the portable terminal when mounted to the cradle device is made usable in the condition hung down from the neck with the use of a neck hang strap provided on the portable terminal.

5. The portable terminal cradle device according to the paragraph 2 above, including a rotate and slide cover (16) as a part of the rotatable portion, and characterized in that the portable terminal cradle device can also be used as a stand in the condition where the cradle device is held in a standing position by means of the rotate and slide cover (16) which is left unlocked by engaging only the two of the projections (11) of the portable terminal cradle device in the two of the grooves (6) in the upper end of the portable terminal, while not engaging the other two projections (18) of the portable terminal cradle device in the two grooves (7) in the lower end of the portable terminal.

6. A combination of a portable terminal and a portable terminal cradle device characterized in that the portable terminal and the portable terminal cradle device are mounted to each other by mutually engaging grooves and projections formed at four corners of the portable terminal and the portable terminal cradle device.

BRIEF DESCRIPTION OF THE DRAWINGS

FIGS. 15A, 15B, and 15C are diagrams illustrating operation of a rotate and slide mechanism according to the embodiment;

Figure 1:
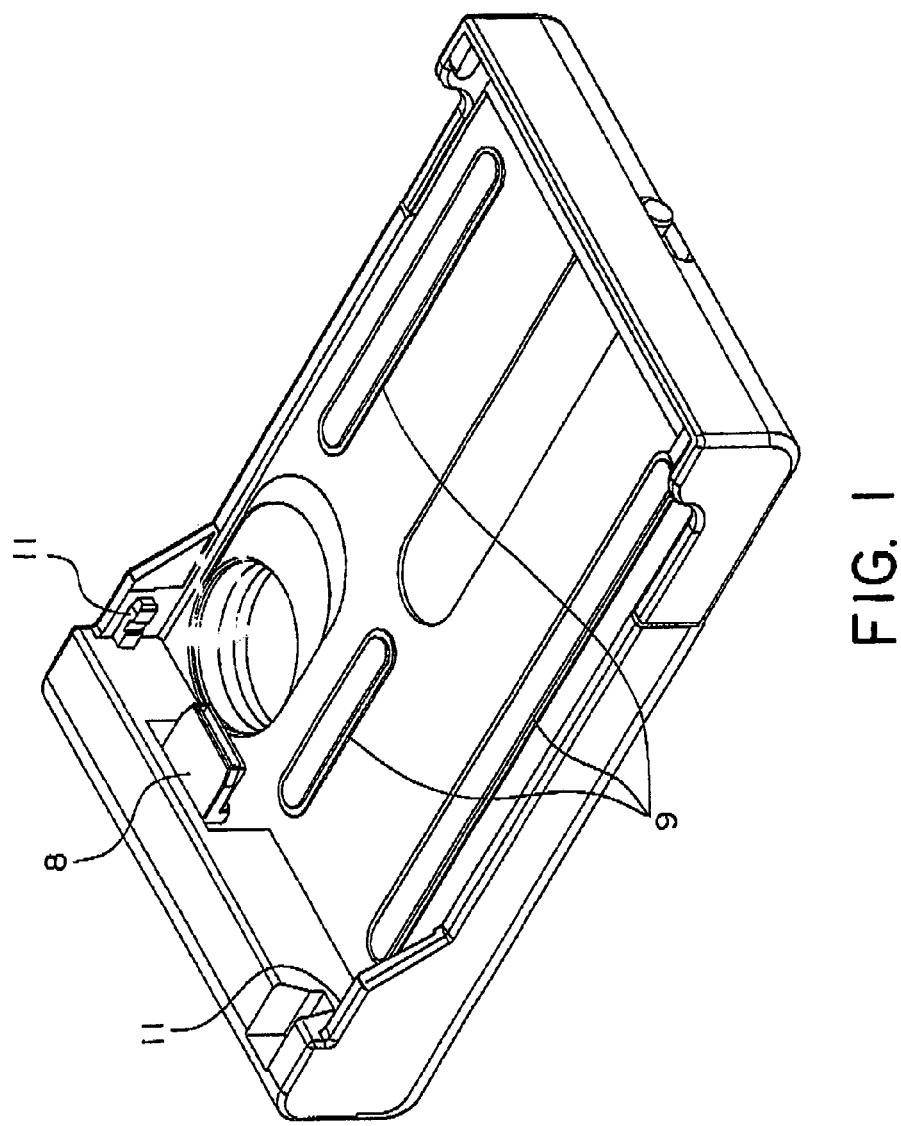
FIG. 1 is a perspective view of a cradle device according to an embodiment of the present invention.

EXPLANATION OF REFERENCE NUMERALS 1 monitor
2 front operating portion
3 multi-function connector
4 camera
5 side operating portion
6 upper groove
7 lower groove
8 connector joint
9 sliding tape
10 externally connecting multi-function connector
11 projection
12 circuit board
13 internal battery
14 uppercase
15 undercover
16 rotate and slide cover
17 rotate and slide mechanism

BEST MODE FOR CARRYING OUT THE INVENTION

An embodiment of the present invention will be described in detail with reference to the drawings.

A cradle device according to the present invention is a cradle device a cradle device designed to be connected to a portable terminal which is provided with a connector at an upper part thereof for external electrical connection and with grooves formed at four corners of the outline to be held by means of the grooves. The cradle device has a structure to allow the portable terminal to slide so that the grooves formed in the connector portion and the portable terminal body can be securely engaged. The cradle device also has a rotate and slide mechanism in the face thereof opposing the connector, and has a structure to ensure reliable engagement with the grooves formed in the portable terminal body.

According to the present invention, when the portable terminal is engaged with the cradle device along projections thereon, the upper portion of the portable terminal is gripped and the connectors of the portable terminal and the cradle terminal are connected to each other. A slidable and rotatable portion is rotated by about 80 degrees and then slid, whereby the grooves formed in the portable terminal are fitted on the projections formed on the rotatable and slidable portion to hold the lower portion of the portable terminal. Further, a lock switch prevents accidental separation of the cradle from the portable terminal during normal use.

Figure 2:
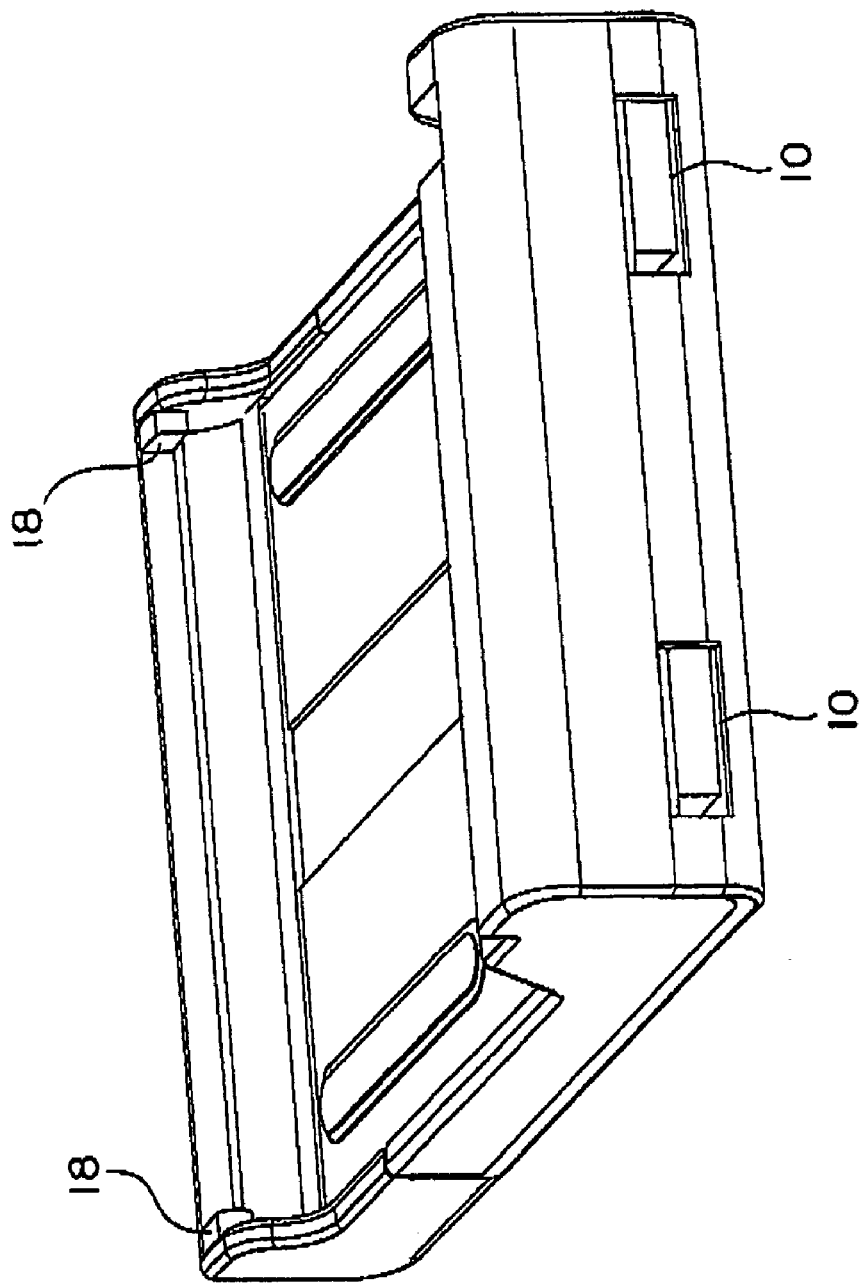
FIG. 2 is a perspective view of the cradle device in FIG. 1 as viewed from the opposite face.
Figure 3:
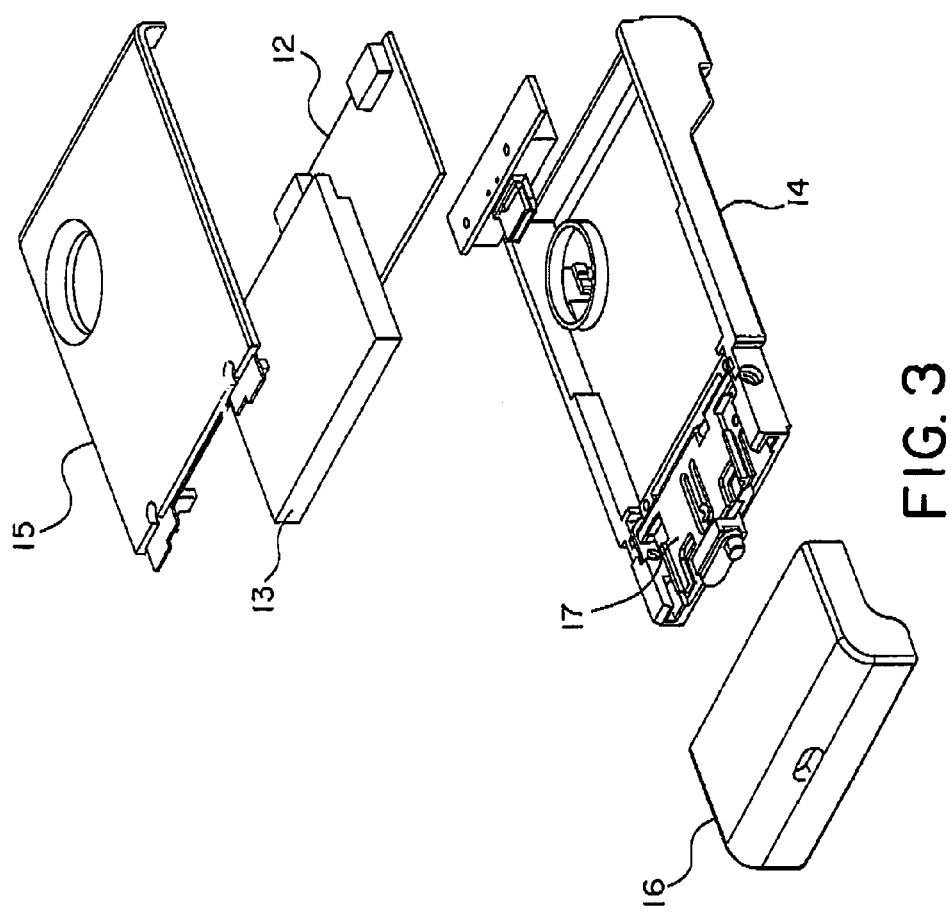
FIG. 3 is an exploded view of the cradle device in FIG. 1.
Figure 4:
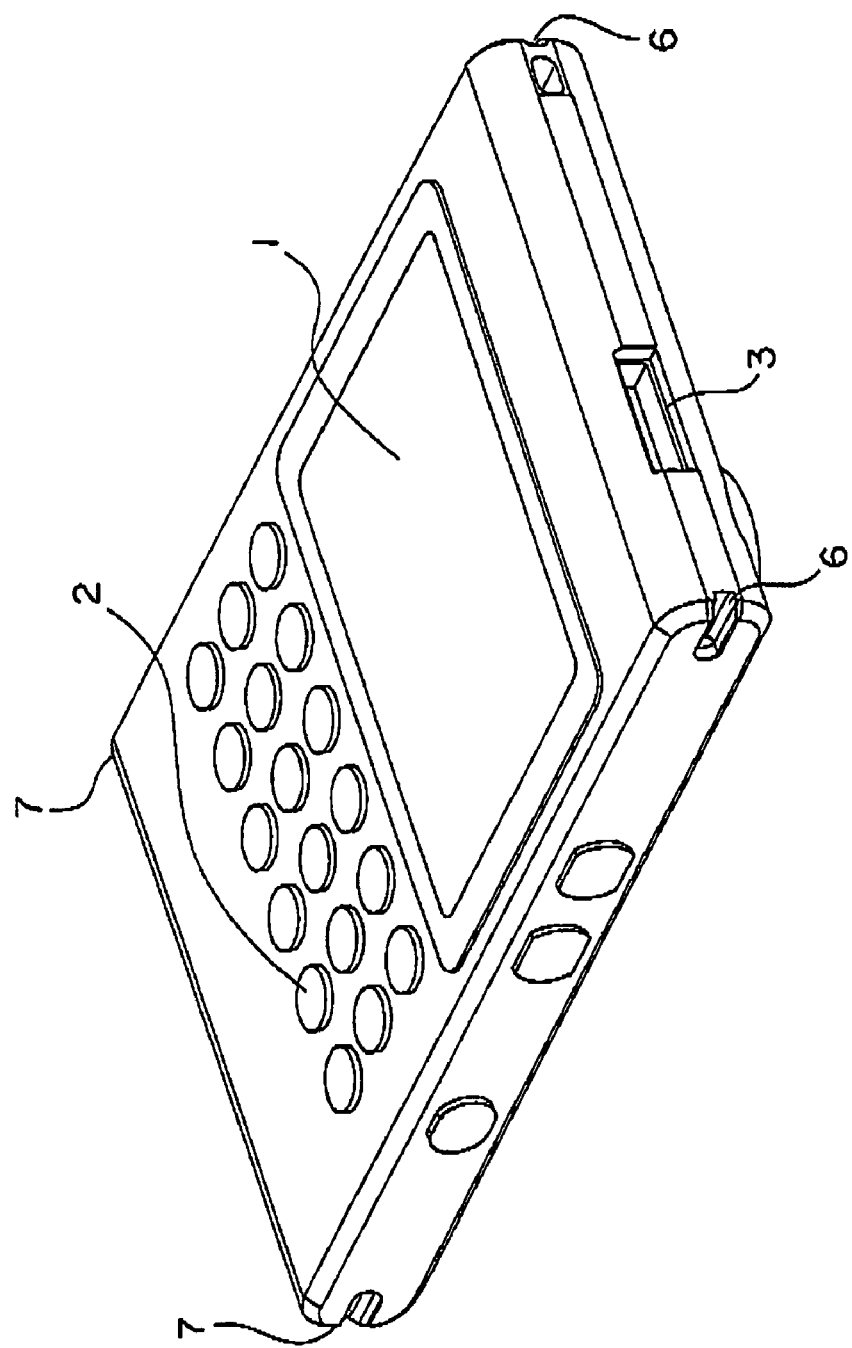
FIG. 4 is a perspective view of a portable terminal to which the cradle device of FIG. 1 is mounted.
Figure 5:
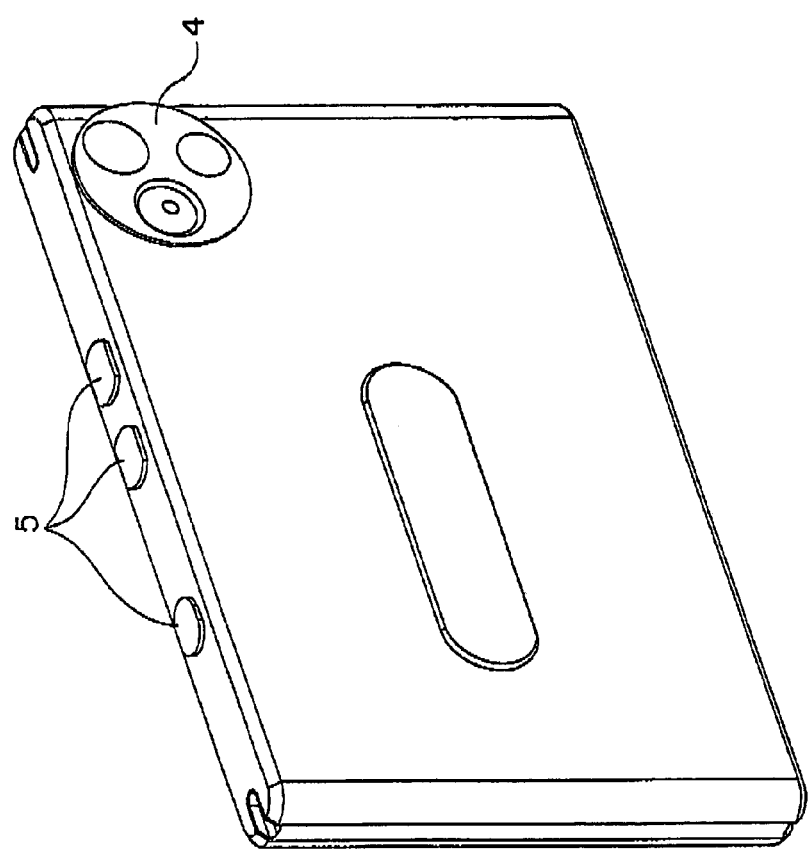
FIG. 5 is a perspective view of the portable terminal as viewed from the rear.
Figure 6:
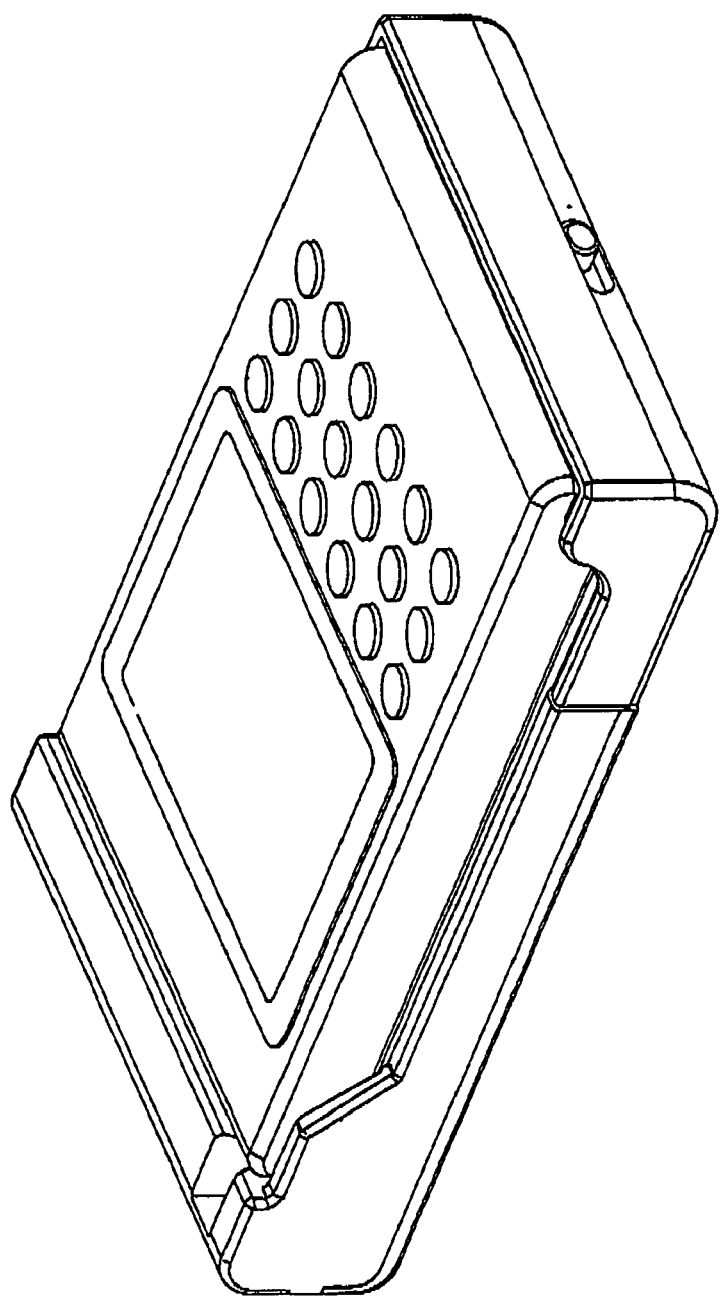
FIG. 6 is a diagram showing the cradle device of FIG. 1 mounted to the portable terminal.
Figure 7:
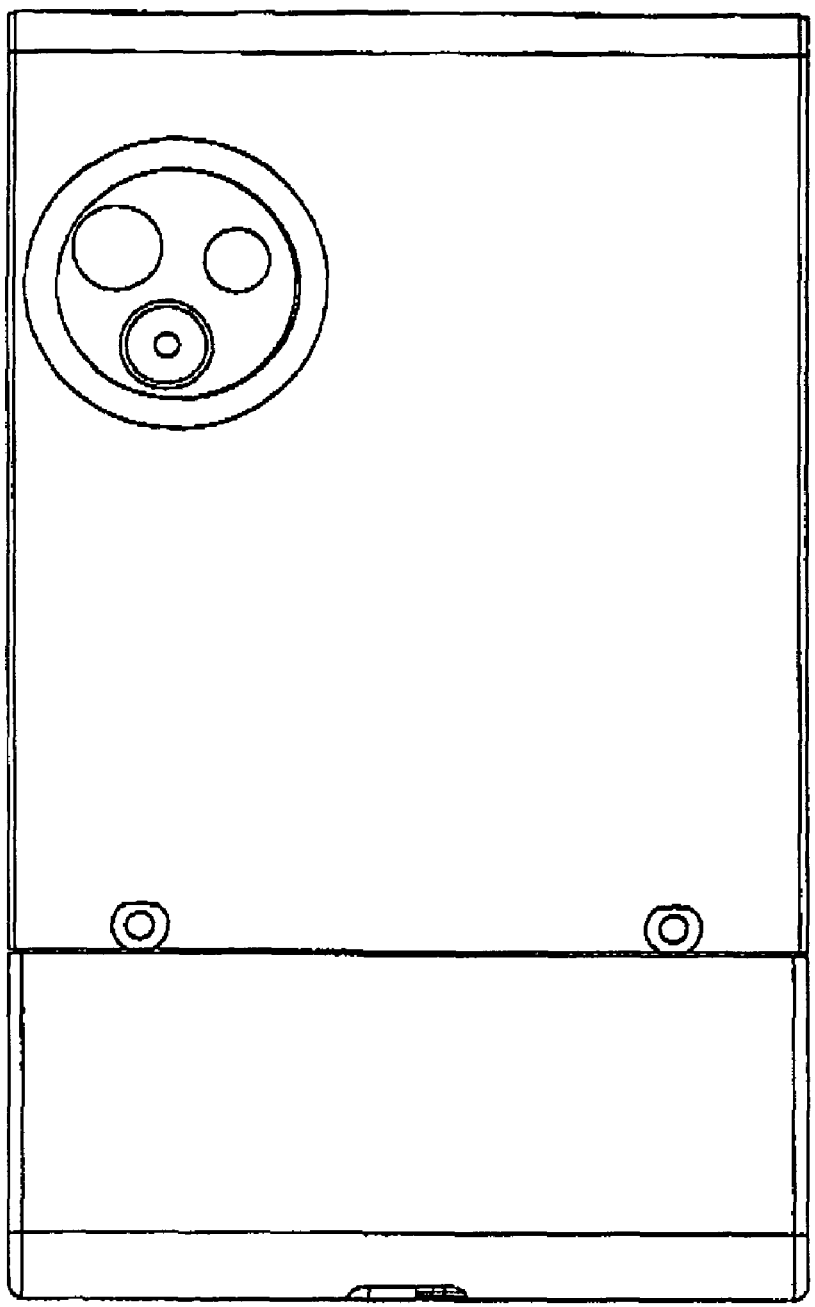
FIG. 7 is a rear view of FIG. 6.

Referring to FIG. 1, a perspective view of a cradle device is illustrated as an embodiment of the present invention. FIG. 2 is a perspective view of the cradle device of FIG. 1 as viewed from the opposite face. FIG. 3 is an exploded view of the cradle device of FIG. 1. FIG. 4 shows a portable terminal to which the cradle device of FIG. 1 is mounted. FIG. 5 is a perspective view of the portable terminal as viewed from the rear. FIG. 6 is a diagram showing the portable terminal having the cradle device of FIG. 1 mounted thereon. FIG. 7 is a rear view of FIG. 6.

As shown in FIG. 4, the portable terminal has a monitor 1, a front operating portion 2, and a multi-function connector 3. As shown in FIG. 5, the portable terminal further has a camera 4, and a side operating portion 5. As seen from FIG. 4, upper grooves 6 are formed at the opposite ends of the upper part, and lower grooves 7 are formed at the opposite ends of the lower part. The multi-function connector 3 shown in FIG. 4 is a connector having various functions, for example, for connection of a charging cable, connection of an earphone or microphone, and connection a data communication cable.

As shown in FIG. 1, the cradle device has a connector joint 8, and sliding tapes 9. The cradle device further has two externally connecting multi-function connectors 10 as shown in FIG. 2, and projections 11 (FIG. 1) to be fitted in the upper grooves 6 of the portable terminal. As seen from FIG. 3, the cradle device has a circuit board 12, an internal battery 13, an upper case 14, an undercover 15, a rotate and slide cover 16, and a rotate and slide mechanism 17. As shown in FIG. 2, the rotate and slide cover 16 is provided with projections 18 to be fitted in the lower grooves 7 of the portable terminal. The two externally connecting multi-function connectors 10 are provided as shown in FIG. 2 so that, when the cradle device of the invention is mounted on the portable terminal, two of the multiple functions can be used at a time, whereas the portable terminal by itself can perform only a single function at a time.

Figure 8:
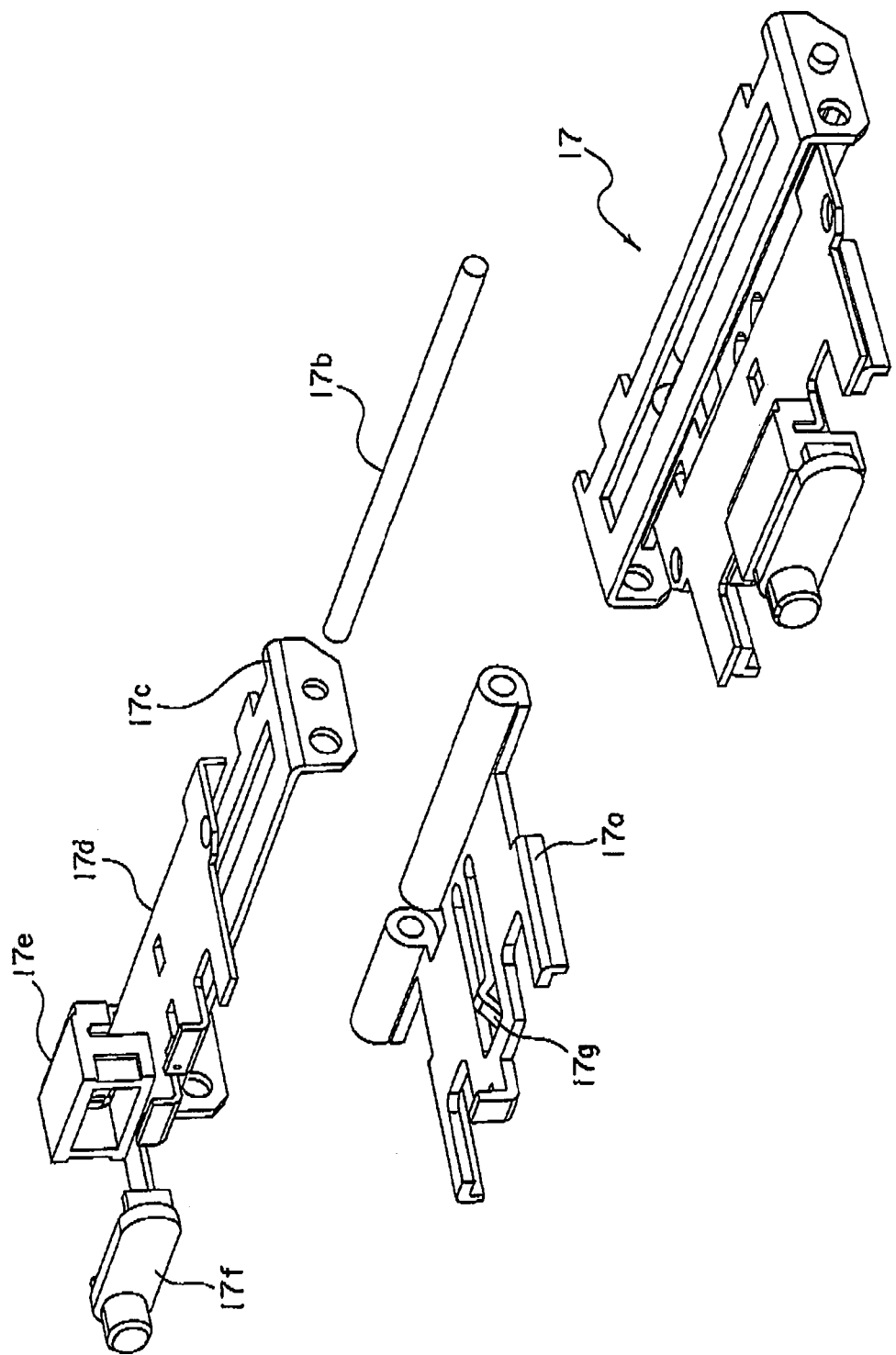
FIG. 8 is a diagram illustrating operation of the embodiment.

A description will be made of a rotate and slide mechanism 17 shown in FIG. 8. The rotate and slide mechanism 17 includes a hinge 17a performing rotational operation, a shaft 17b defining a rotational axis, a hinge holder 17c supporting the hinge 17a, a slide plate 17d supporting the linear motion of the hinge 17a together with the rotate and slide cover 16, a lock block 17e operating in an orthogonal direction to the slide plate 17d to allow the hinge 17a and the slide plate 17d to slide in a linear direction or to provide fixation in the close position according to the position of the lock block 17e, and a lock block 17f for operating the lock block 17e.

A description will be made of operation of the first embodiment with reference to FIGS. 9 to 16.

Figure 9:
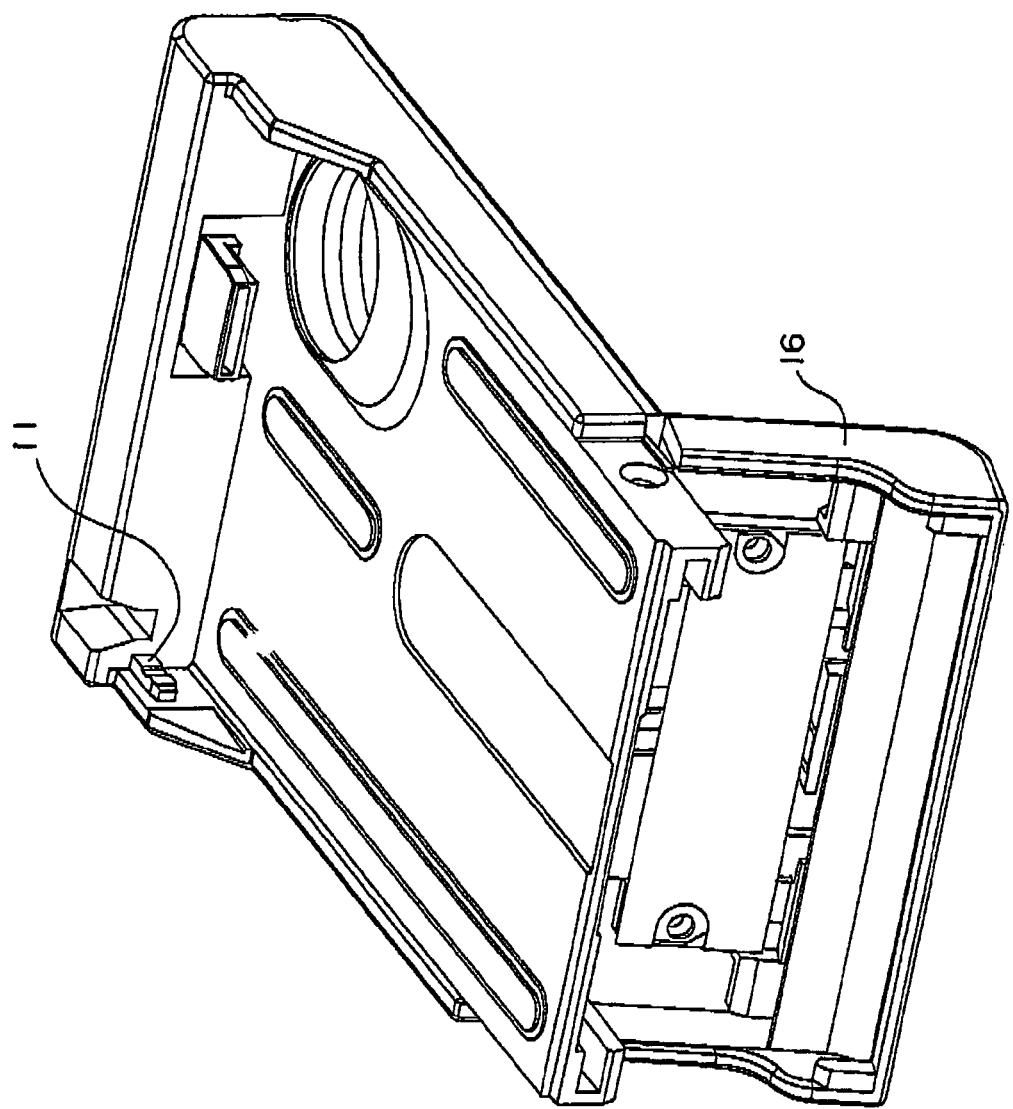
FIG. 9 is a diagram illustrating operation of the embodiment.
Figure 10:
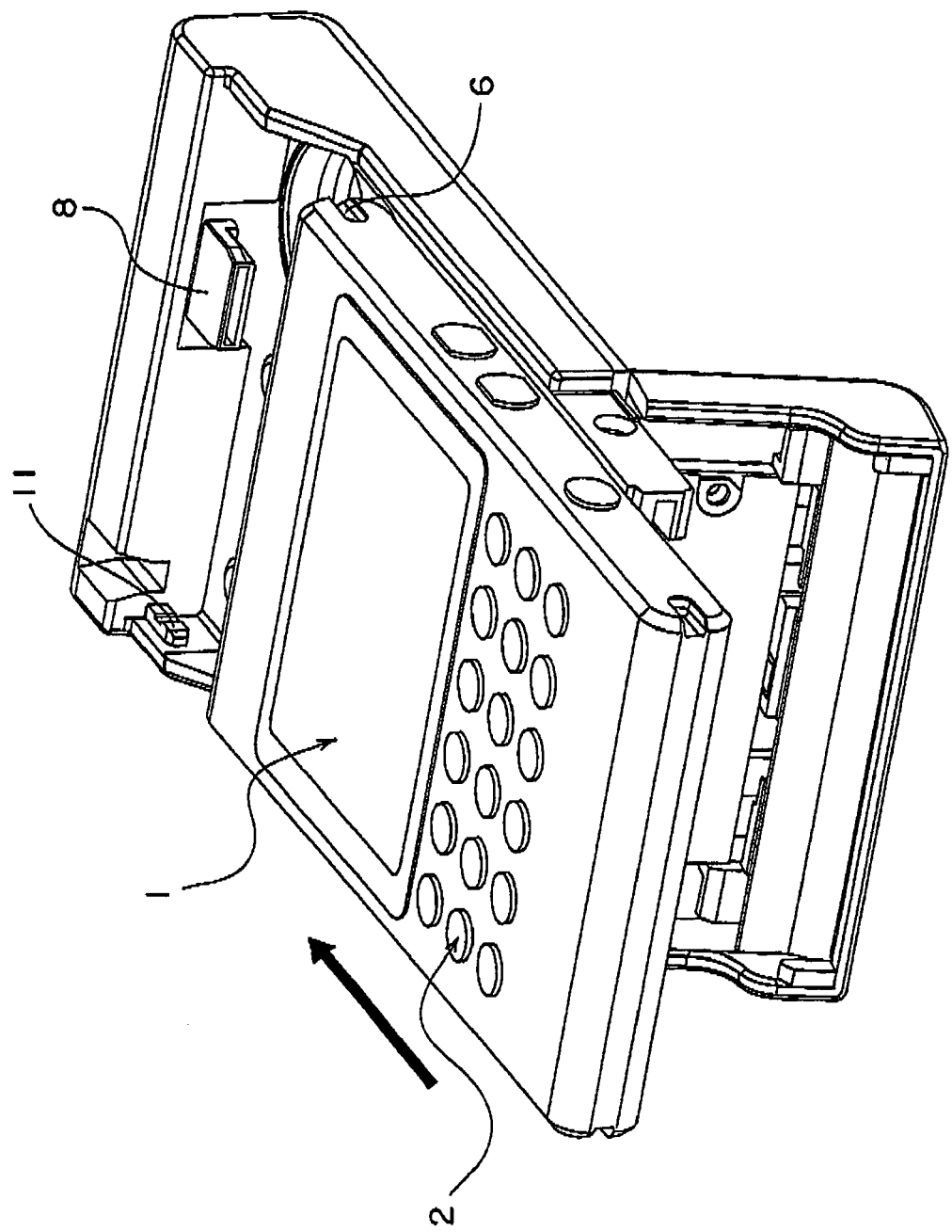
FIG. 10 is a diagram illustrating operation of the embodiment.

FIG. 9 shows the initial state in which the rotate and slide cover 16 of the cradle device is opened. The portable terminal is inserted into the cradle device in the initial state, along the direction indicated by the arrow in FIG. 10 with the monitor 1 and the front operating portion 2 facing up. Firstly, the upper grooves 6 of the portable terminal are fitted on the projections 11. Subsequently, the connector of the connector joint 8 is inserted into the multi-function connector 3 (FIG. 4). The connector joint 8 is provided with a minute degree of freedom to absorb the dimensional tolerance between the connectors.

Figure 11:
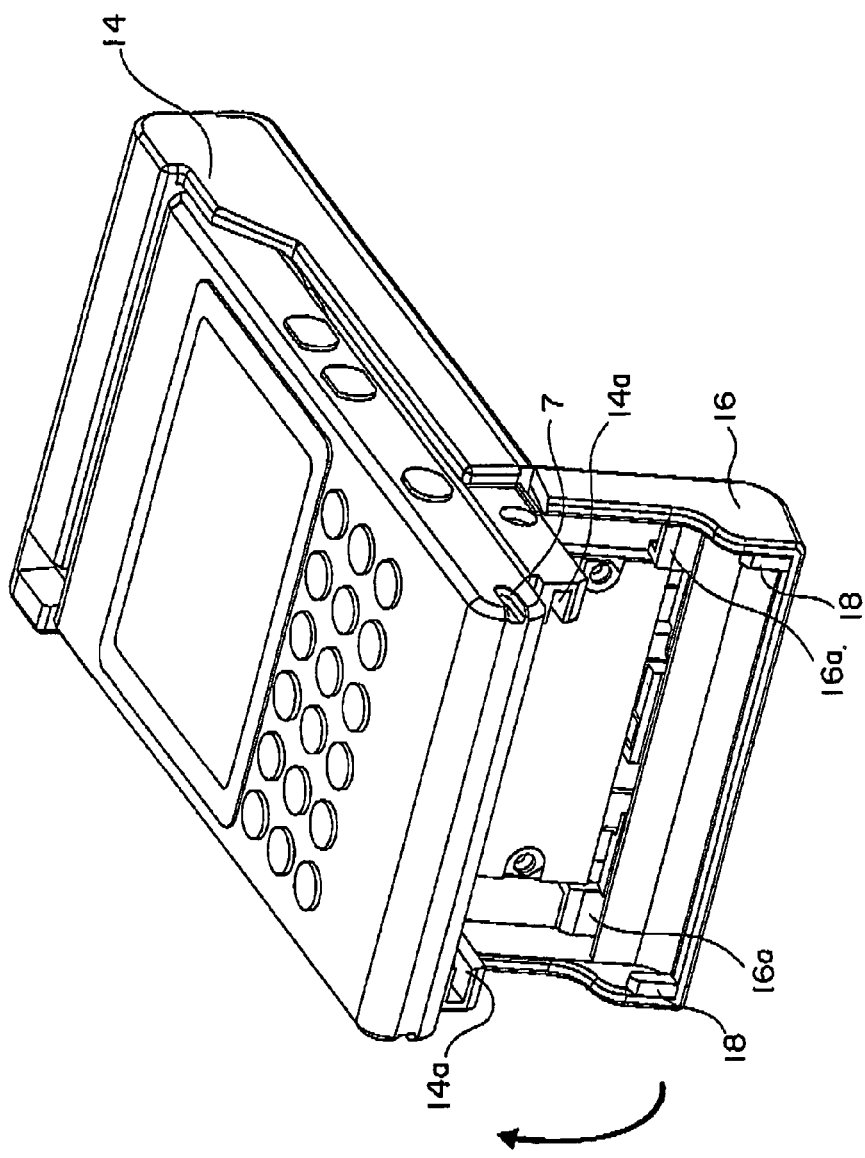
FIG. 11 is a diagram illustrating operation of the embodiment.
Figure 12:
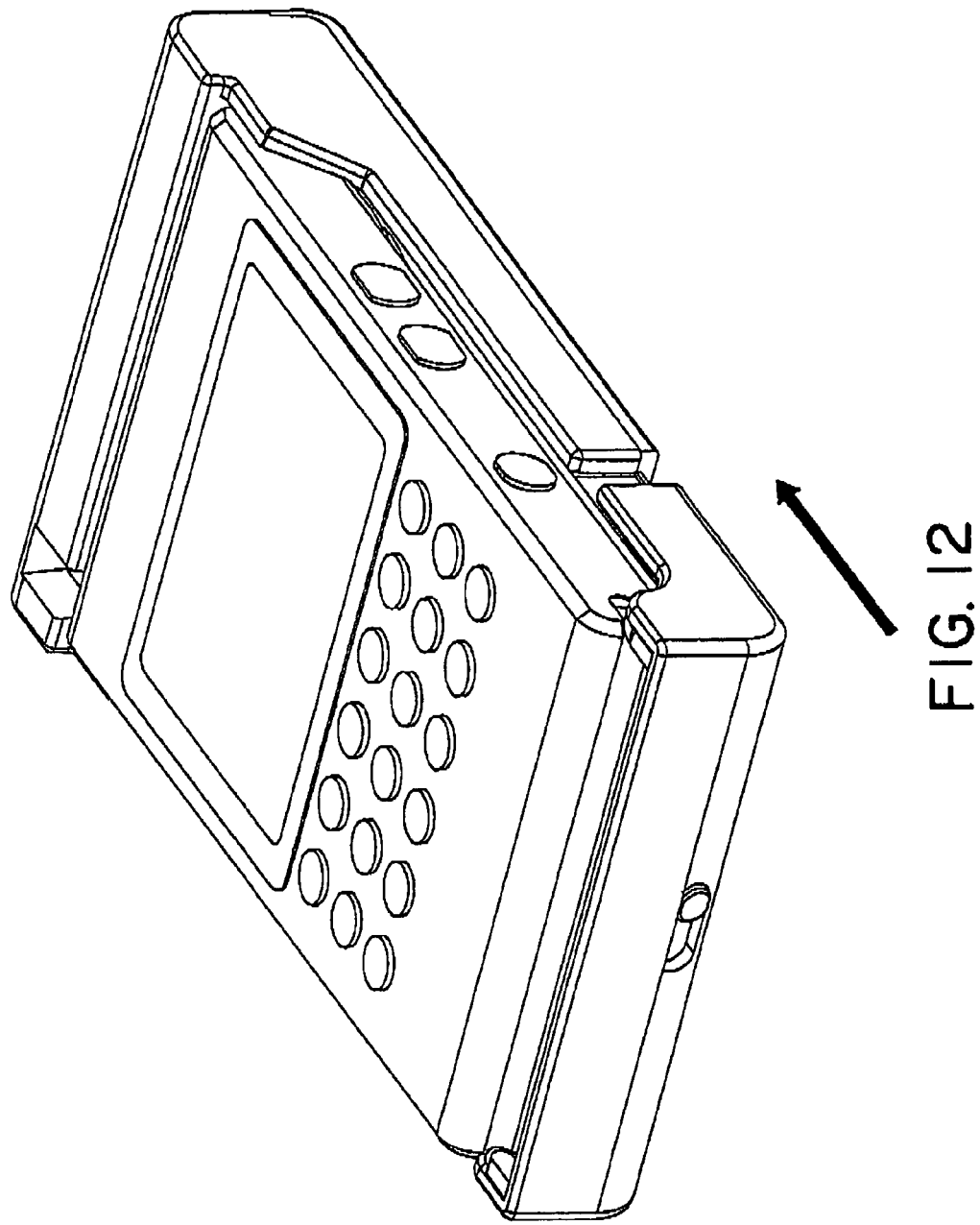
FIG. 12 is a diagram illustrating operation of the embodiment.
Figure 13:
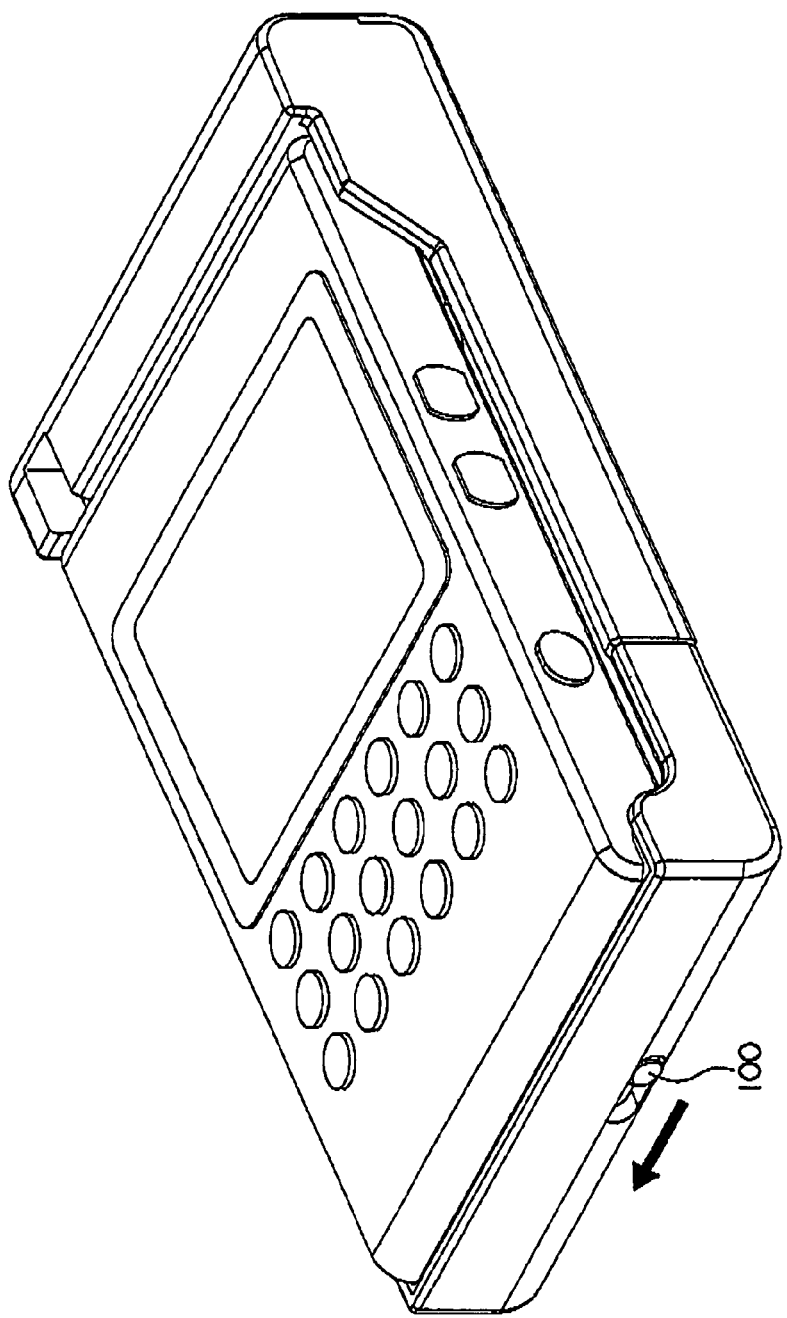
FIG. 13 is a diagram illustrating operation of the embodiment.
Figure 14:
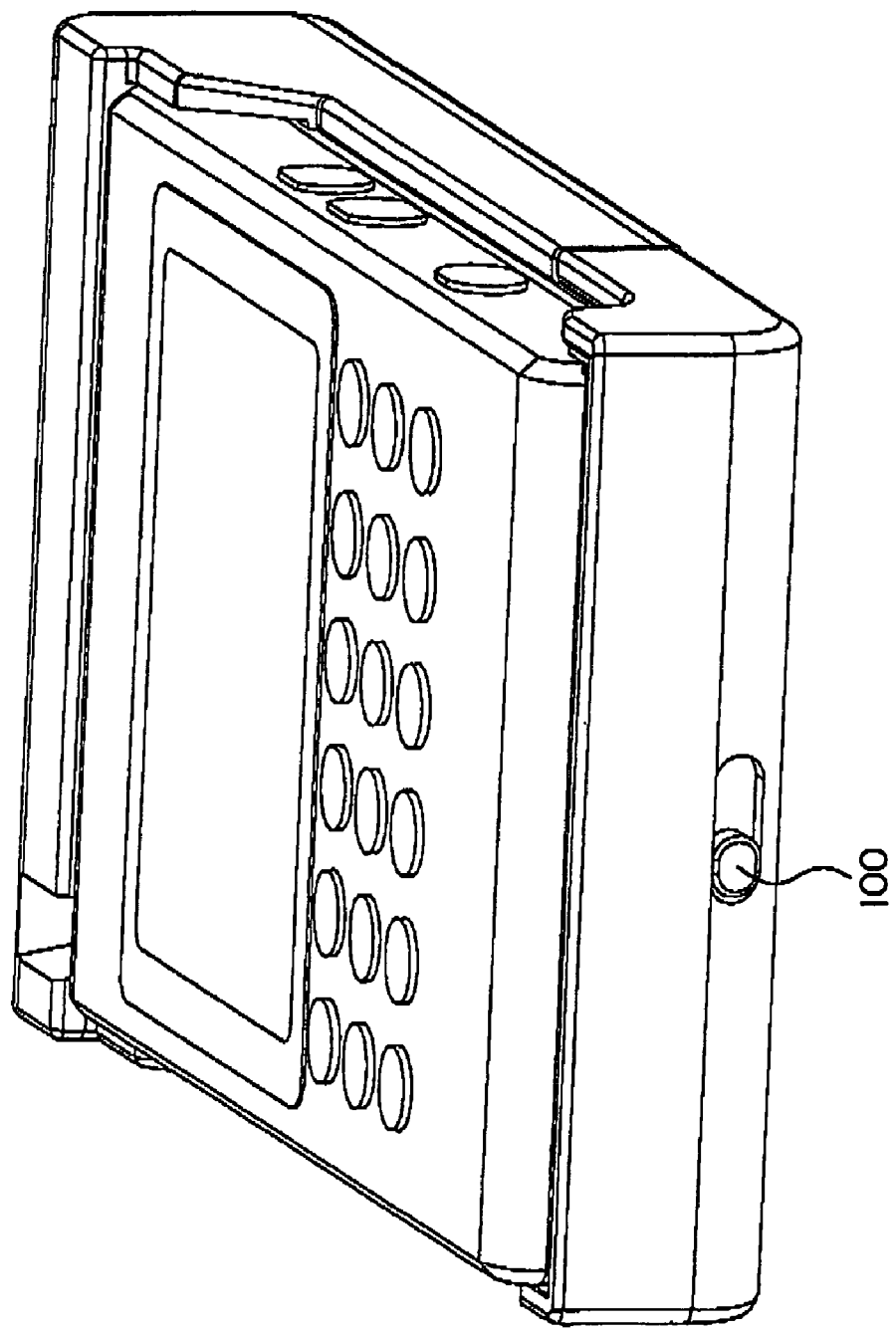
FIG. 14 is a diagram illustrating operation of the embodiment.

As shown in FIG. 11 the rotate and slide cover 16 is rotated, after the insertion of the portable terminal, until the projections 18 of the rotate and slide cover 16 are parallel to the lower grooves 7 (FIG. 12). The rotate and slide cover 16 is then slid to fit the lower grooves 7 in the projections 18. Thus, fixing grooves 14a formed in the upper case 14 are fitted in fixing projections 16a formed on the rotate and slide cover, whereby the rotate and slide cover 16 can be fixed to the upper case 14 by sliding the same even if the portable terminal is not mounted. As a result, the grooves formed at the four corners of the portable terminal are fitted on the four projections formed on the cradle device, whereby the cradle device is connected to the portable terminal very firmly. Additionally, the slide cover 16 is prevented from being easily opened, by locking a lock switch 100 as shown in FIGS. 13 and 14.

Figure 16:
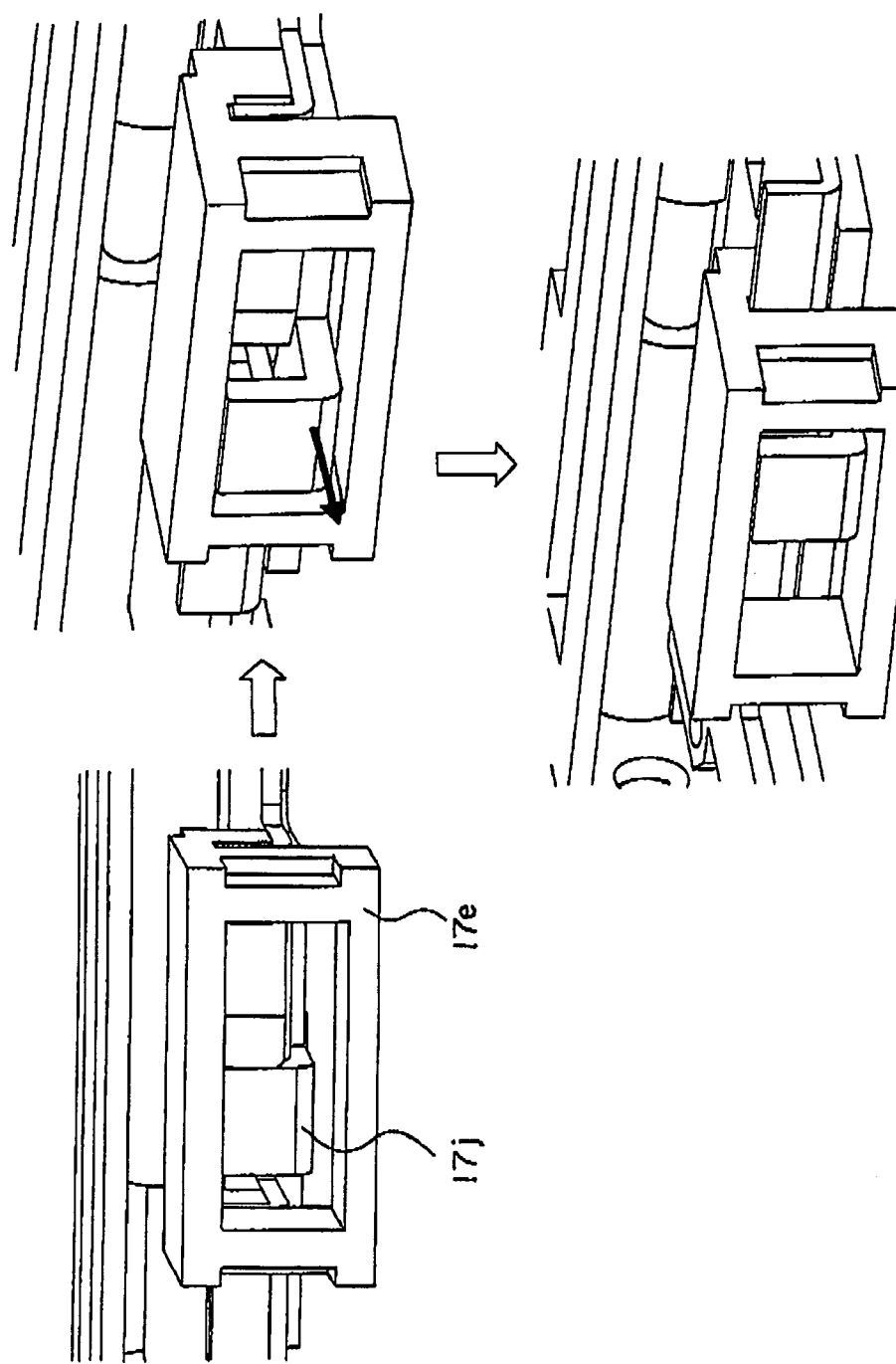
FIG. 16 is a diagram illustrating operation of the rotate and slide mechanism according to the embodiment.

A description will be made of operation of the rotate and slide mechanism 17 with reference to FIG. 8. The hinge 17a is freely rotatable around a shaft 17b serving as a rotational axis. A leaf spring 17g is incorporated in the hinge 17a, so that a projection of the leaf spring 17g is fitted in a hole in a slide plate 17d to thereby stop the sliding at two positions. In this mechanism, as shown in FIG. 15A, the slide plate 17d is folded to erect the same vertically to form a raised rail 17h. A groove 17i is formed in the slide block to allow the slide block (lock switch) 100 (having the lock blocks 17e and 17f as shown in FIG. 8) to move transversely along the rail 17h. The rail of the slide plate 17d is discontinued at a central portion thereof to allow a stopper claw 17j of the hinge 17a to move back and forth in this portion, as shown in FIGS. 15B and 15C. This means that the lock switch cannot be moved transversely as shown in FIG. 16, when the hinge 17a is extended with respect to the slide plate 17d, or when the slide plate 17d and the hinge 17a are stopped at a position where they are separated from each other. In contrast, when the slide plate 17d is contracted with respect to the hinge 17a, or when the slide plate 17d and the hinge 17a are stopped at a position where they are close to each other, the lock switch becomes movable. When the lock switch is moved, the stopper claw of the hinge 17d moves along the groove in the lock switch and is caught in the groove in the lock switch.

Figure 17:
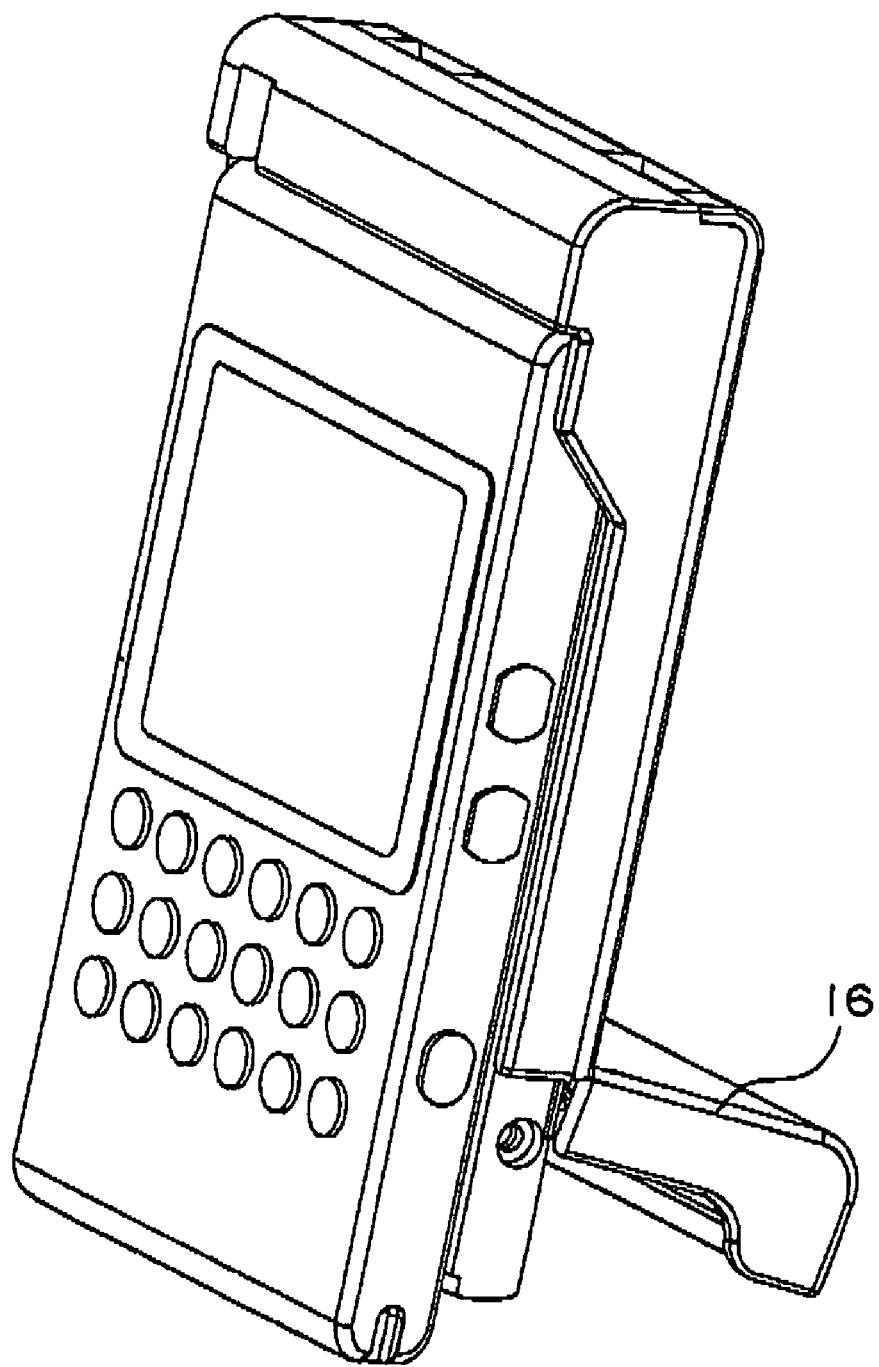
FIG. 17 is a diagram showing another example of usage of the cradle device according to the embodiment.

Further, the portable terminal cradle device according to the present invention can also be used as a stand, as shown in FIG. 17, by fitting only the upper grooves without fixing the rotatable and slidable portion.

In the embodiment above, the lock switch need not be used to fix. Instead, each of the grooves of the portable terminal and the projections of the cradle device may be provided with a stepped portion to form an easy lock.

ADVANTAGEOUS EFFECTS OF THE INVENTION

A first advantageous effect of the present invention resides in that a cradle device having superior portability when connected to a portable terminal body can be obtained.

A second advantageous effect of the present invention resides in that the simple mechanism and the simple operation allow the portable terminal body to be securely held at the four corners thereof and thus to be protected reliably when subjected to drop impact.

A third advantageous effect of the present invention resides in that the engagement between the grooves formed at the four corners of the portable terminal and the projections of the cradle device eliminates the need of covering the front face of the portable terminal with the housing of the cradle device, and hence the cradle device does not obstruct the operation of the portable terminal when used with the cradle device connected thereto.

A fourth advantageous effect of the present invention resides in that the cradle device can be used as a stationary holder in the condition where the rotating portion is not fixed.

The invention claimed is:

1. A portable terminal cradle device comprising a plurality of projections to be fitted on grooves in upper and lower ends of a portable terminal; characterized in that:
   the projections of the portable terminal cradle device are engaged in the grooves in the upper end of the portable terminal;
   the other projections of the portable terminal cradle device are engaged in the grooves in the lower end of the portable terminal and the engagement is held by a rotate and slide mechanism which is capable of, after rotation of said other projections of the portable terminal cradle device with respect to the portable terminal engaged with the projections of the portable terminal cradle device, sliding said other projections of the portable terminal cradle device into the grooves in the lower end of the portable terminal; and
   two of the grooves in the upper end of the portable terminal and two of the grooves in the lower end of the portable terminal are formed at four corners of the portable terminal, said portable terminal cradle device holds the four corners of the portable terminal.

2. The portable terminal cradle device according to claim 1, characterized in that:
   the projections of the portable terminal cradle device are engaged in the grooves in the upper end of the portable terminal, while, at the same time, the cradle device is electrically connected to the portable terminal through a connector joint provided for connection to a connector of the portable terminal.

3. The portable terminal cradle device according to claim 1, further comprising a mechanism for locking the rotate and slide mechanism, wherein lock blocks are slid along an L-shaped folded portion formed in a slide plate of the rotate and slide mechanism to fix and release an L-shaped folded portion formed in a hinge.

4. A portable terminal cradle device according to claim 1, comprising a rotate and slide cover as a part of a rotatable portion, and characterized in that the portable terminal cradle device can also be used as a stand in the condition where the cradle device is held in a standing position by means of the rotate and slide cover by engaging the projections of the portable terminal cradle device in the grooves in the upper end of the portable terminal.

5. A combination of a portable terminal and a portable terminal cradle device according to any one of claims 1-3 and 4, characterized in that the portable terminal and the portable terminal cradle device are mounted to each other by mutually engaging grooves and projections formed in the portable terminal and the portable terminal cradle device.

6. A portable terminal cradle device comprising a plurality of projections to be fitted on grooves formed in upper and lower ends of a portable terminal, characterized in that:
   the projections of the portable terminal cradle device are engaged in the grooves in the upper end of the portable terminal;
   the other projections of the portable terminal cradle device are engaged in the grooves in the lower end of the portable terminal and the engagement is held by a rotate and slide mechanism which is capable of both rotation and sliding; and
   the portable terminal cradle device does not project forward beyond a monitor or an operating face of the portable terminal, whereby the operation of the portable terminal when mounted to the cradle device is made easy and the portable terminal when mounted to the cradle device is made usable in the condition hung down from a user neck with the use of a neck hang strap provided on the portable terminal;

said portable terminal cradle device further comprising a mechanism for locking the rotate and slide mechanism, wherein lock blocks are slid along an L-shaped folded portion formed in a slide plate of the rotate and slide mechanism to fix and release an L-shaped folded portion formed in a hinge.

7. The portable terminal cradle device according to any one of claims 1-3, 4, and 6, comprising the projections formed at four corners thereof to be fitted on two of the grooves formed in the upper end of the portable terminal and two of the grooves formed in the lower end of the portable terminal.

8. A combination of a portable terminal and a portable terminal cradle device according to claim 6, characterized in that the portable terminal and the portable terminal cradle device are mounted to each other by mutually engaging grooves and projections formed in the portable terminal and the portable terminal cradle device.

9. A portable terminal cradle device comprising a plurality of projections to be fitted on grooves in upper and lower ends of a portable terminal; characterized in that:

the projections of the portable terminal cradle device are engaged in the grooves in the upper end of the portable terminal; and the other projections of the portable terminal cradle device are engaged in the grooves in the lower end of the portable terminal and the engagement is held by a rotate and slide mechanism which is capable of both rotation and sliding;

said portable terminal cradle device further comprising a mechanism for locking the rotate and slide mechanism, wherein lock blocks are slid along an L-shaped folded portion formed in a slide plate of the rotate and slide mechanism to fix and release an L-shaped folded portion formed in a hinge.

10. The portable terminal cradle device according to claim 9, characterized in that:

the projections of the portable terminal cradle device are engaged in the grooves in the upper end of the portable terminal, while, at the same time, the cradle device is electrically connected to the portable terminal through a connector joint provided for connection to a connector of the portable terminal.

* * * * *